US012075419B2

United States Patent
Huang et al.

(10) Patent No.: US 12,075,419 B2
(45) Date of Patent: Aug. 27, 2024

(54) SIGNALING OF PUCCH AND PUSCH SIMULTANEOUS TRANSMISSION OR MULTIPLEXING

(71) Applicant: QUALCOMM Incorporated, San Diego, CA (US)

(72) Inventors: Yi Huang, San Diego, CA (US); Seyedkianoush Hosseini, San Diego, CA (US); Wei Yang, San Diego, CA (US); Ahmed Elshafie, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 421 days.

(21) Appl. No.: 17/471,751

(22) Filed: Sep. 10, 2021

(65) Prior Publication Data
US 2022/0086826 A1   Mar. 17, 2022

Related U.S. Application Data

(60) Provisional application No. 63/079,285, filed on Sep. 16, 2020.

(51) Int. Cl.
*H04W 72/21* (2023.01)
*H04W 72/0446* (2023.01)
(Continued)

(52) U.S. Cl.
CPC ....... *H04W 72/21* (2023.01); *H04W 72/0446* (2013.01); *H04W 72/0453* (2013.01); *H04W 72/56* (2023.01); *H04L 5/001* (2013.01)

(58) Field of Classification Search
CPC ............. H04W 72/21; H04W 72/0446; H04W 72/0453; H04W 72/56; H04W 72/569;
(Continued)

(56) References Cited

U.S. PATENT DOCUMENTS

2010/0238831 A1 * 9/2010 Jeong ............. H04W 28/06 370/252

FOREIGN PATENT DOCUMENTS

KR   20190097698 A * 2/2018 ........... H04L 1/0061

OTHER PUBLICATIONS

Huawei, et al., "sTTI Combinations in CA Scenarios", 3GPP Draft, R1-1717128, 3GPP TSG RAN WG1 Meeting #90bis, 3rd Generation Partnership Project (3GPP), Mobile Competence Centre, 650, Route Des Lucioles, F-06921 Sophia-Antipolis Cedex, France, vol. RAN WG1. No. Prague. Czech Republic, Oct. 9, 2017-Oct. 13, 2017, Oct. 8, 2017 (Oct. 8, 2017), XP051340318, 4 Pages, Retrieved from the Internet: URL:http://www.3gpp.org/ftp/Meetings_3GPP_SYNC/RAN1/Docs/ [retrieved on Oct. 8, 2017] Section 3.
(Continued)

*Primary Examiner* — Chi H Pham
*Assistant Examiner* — Raul Rivas
(74) *Attorney, Agent, or Firm* — Procopio, Cory, Hargreaves

(57) ABSTRACT

Apparatus, methods, and computer-readable media for facilitating signaling of PUCCH and PUSCH simultaneous transmission or multiplexing are disclosed herein. An example method for wireless communication at a UE includes receiving, from a base station, an overlapping uplink transmission configuration. The example method also includes detecting an occurrence of an overlapping uplink transmission comprising at least a portion of uplink control information and at least a portion of uplink data overlapping in a time domain. Additionally, the example method includes transmitting at least one of the uplink control information or the uplink data based on the overlapping uplink transmission configuration.

32 Claims, 11 Drawing Sheets

(51) Int. Cl.
    *H04W 72/0453*     (2023.01)
    *H04W 72/56*     (2023.01)
    *H04L 5/00*     (2006.01)

(58) Field of Classification Search
    CPC ........ H04W 8/24; H04W 24/02; H04L 5/001; H04L 5/0044; H04L 5/0091; H04L 5/0053
    See application file for complete search history.

(56) References Cited

OTHER PUBLICATIONS

International Search Report and Written Opinion—PCT/US2021/050128—ISA/EPO—Dec. 6, 2021.
LG Electronics: "Email Discussion [90-12] on sPUSCH/sPUCCH Power Control and Remaining Issues on Collisions in UL", 3GPP Draft, R1-1718793, 3GPP TSG RAN WG1 Meeting #90bis, 3rd Generation Partnership Project (3GPP), Mobile Competence Centre, 650, Route Des Lucioles, F-06921 Sophia-Antipolis Ced, vol. RAN WG1, No. Prague, Czech Republic, Oct. 9, 2017-Oct. 13, 2017, Oct. 8, 2017 (Oct. 8, 2017). XP051341948, 37 Pages, URL:http://www.3gpp.org/ftp/Meetings_3GPP_SYNC/RAN1/Docs/ [retrieved on Oct. 8, 2017] Section 3, Q.3.1-3.6.
ZTE: "Discussion on Enhanced Intra-UE Multiplexing", 3GPP Draft, R1-2005434, 3GPP TSG RAN WG1 #102e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917459, 6 Pages, Retrieved from the Internet: URL:https://ftp.3gpp.org/tsg_ran/WG1_RL1/TSGR1_102-e/Docs/R1-2005434.zip R1-2005434 Discussion on enhanced intra-UE multiplexing.docx [retrieved on Aug. 8, 2020] Section 2.

* cited by examiner

SIGNALING OF PUCCH AND PUSCH SIMULTANEOUS TRANSMISSION OR MULTIPLEXING

CROSS REFERENCE TO RELATED APPLICATION(S)

This application claims the benefit of and priority to U.S. Provisional Patent Application Ser. No. 63/079,285, entitled "SIGNALING OF PUCCH AND PUSCH SIMULTANEOUS TRANSMISSION OR MULTIPLEXING," and filed on Sep. 16, 2020, which is expressly incorporated by reference herein in its entirety.

TECHNICAL FIELD

The present disclosure relates generally to communication systems, and more particularly, to wireless communications including uplink carrier aggregation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus may receive, from a base station, an overlapping uplink transmission configuration. The example apparatus may also detect an occurrence of an overlapping uplink transmission comprising at least a portion of uplink control information and at least a portion of uplink data overlapping in a time domain. Additionally, the example apparatus may transmit at least one of the uplink control information or the uplink data based on the overlapping uplink transmission configuration.

In another aspect of the disclosure, a method, a computer-readable medium, and an apparatus are provided for wireless communication at a base station. An example apparatus may transmit, to a UE, an overlapping uplink transmission configuration. The example apparatus may also receive, from the UE, an uplink transmission based at least in part on the overlapping uplink transmission configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
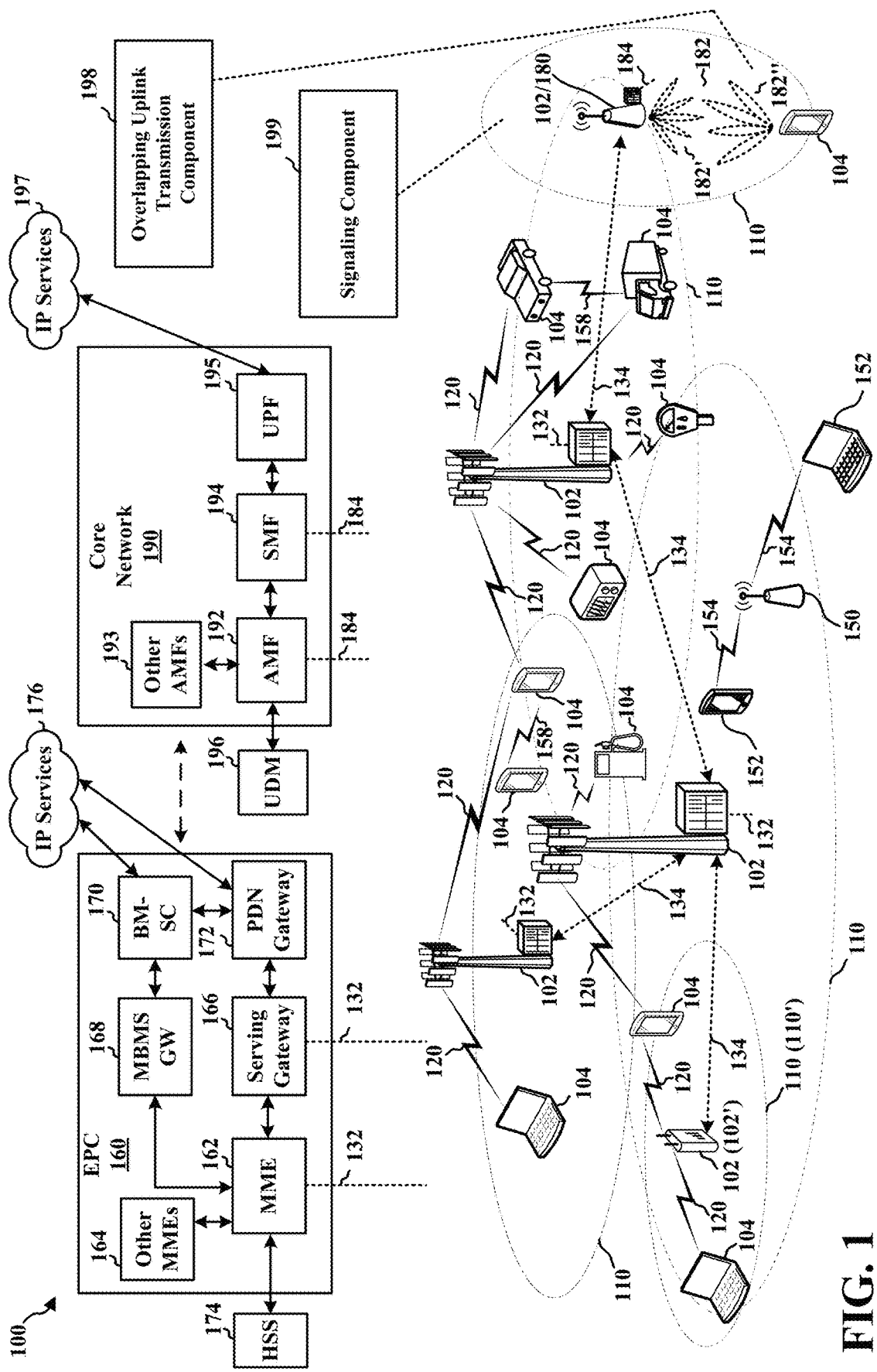
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. The example of the wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Some wireless communication systems may support communications between a UE and a base station on multiple aggregated component carriers (CCs). In some examples, a UE may be configured to transmit uplink signals on different carriers. For example, the UE may be configured to transmit uplink control information (UCI) on a primary CC (PCC) and may be configured to transmit uplink data on a secondary CC (SCC).

In some examples, the uplink control information on the PCC may overlap with the uplink data on the SCC. For example, the uplink control information and the uplink data may overlap in a time domain. In such cases, some UEs may be configured to multiplex the uplink control information on to the uplink data and transmit the uplink data including the multiplexed uplink control information using the SCC. Some UEs may be configured to check the priorities of the uplink control information and the uplink data and modify the overlapping uplink transmission based on the priorities. For example, the UE may multiplex the uplink control information on to the uplink data when the priorities are the same, and the UE may drop the transmission with the lower priority when the priorities are different. Additionally, some UEs may be configured to simultaneously transmit the uplink control information (on the PCC) and the uplink data (on the SCC).

Aspects presented herein enable wireless communication devices, such as a UE 104, to apply a configured overlapping uplink transmission mode to instances of overlapping uplink transmissions. For example, techniques disclosed herein receive an overlapping uplink transmission configuration from a base station that configures the overlapping uplink transmission mode that the UE is to apply when an occurrence of an overlapping uplink transmission is detected. In some examples, the overlapping uplink transmission configuration may be based on a capability of the UE. For example, the UE may be a legacy UE that is capable of performing multiplex-based or priority-based techniques when an overlapping uplink transmission occurrence is detected. In other examples, the UE may be capable of performing simultaneous transmissions in addition to the multiplex-based or priority-based techniques. Thus, it may be beneficial to configure the UE to apply an overlapping uplink transmission mode to an overlapping uplink transmission when an occurrence of an overlapping uplink transmission is detected.

In some examples, a wireless communication device, such as a UE 104, may be configured to manage one or more aspects of wireless communication by applying a transmission mode for overlapping uplink transmissions. As an example, in FIG. 1, the UE 104 may include an overlapping uplink transmission component 198 configured to receive, from a base station, an overlapping uplink transmission configuration. The example overlapping uplink transmission component 198 may also be configured to detect an occurrence of an overlapping uplink transmission comprising at least a portion of uplink control information and at least a portion of uplink data overlapping in a time domain. Additionally, the example overlapping uplink transmission component 198 may be configured to transmit at least one of the uplink control information or the uplink data based on the overlapping uplink transmission configuration.

Still referring to FIG. 1, in some examples, a base station 102/180 may be configured to manage one or more aspects of wireless communication by indicating a transmission to a UE to apply for instances of overlapping uplink transmissions. As an example, in FIG. 1, the base stations 102/180 may include a signaling component 199 configured to transmit, to a UE, an overlapping uplink transmission configuration. The example signaling component 199 may also be configured to receive, from the UE, an uplink transmission based at least in part on the overlapping uplink transmission configuration.

Although the following description provides examples directed to 5G NR, the concepts described herein may be applicable to other similar areas, such as LTE, LTE-A, CDMA, GSM, and/or other wireless technologies, in which a UE may detect occurrences of overlapping uplink transmissions.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
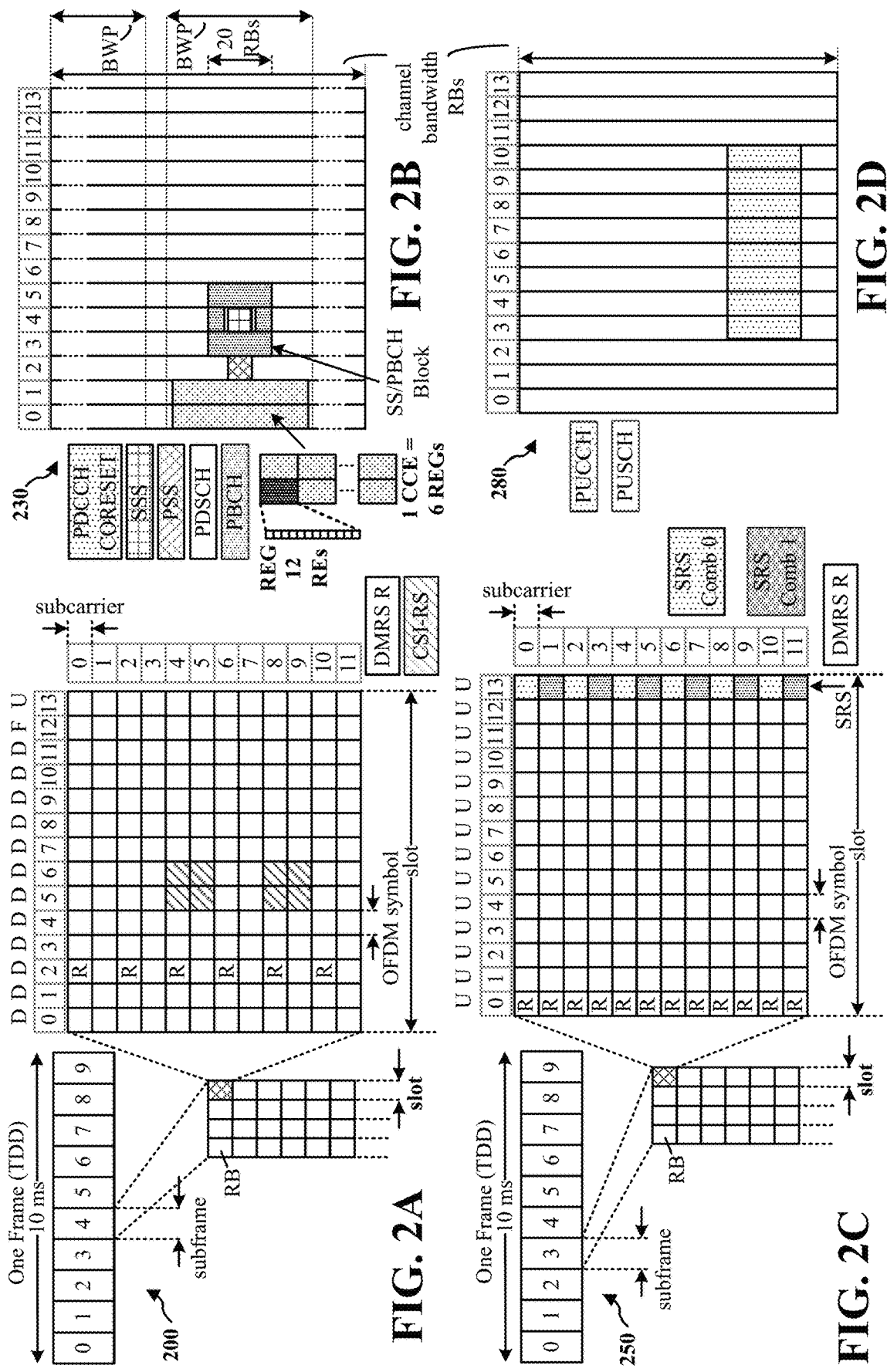
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
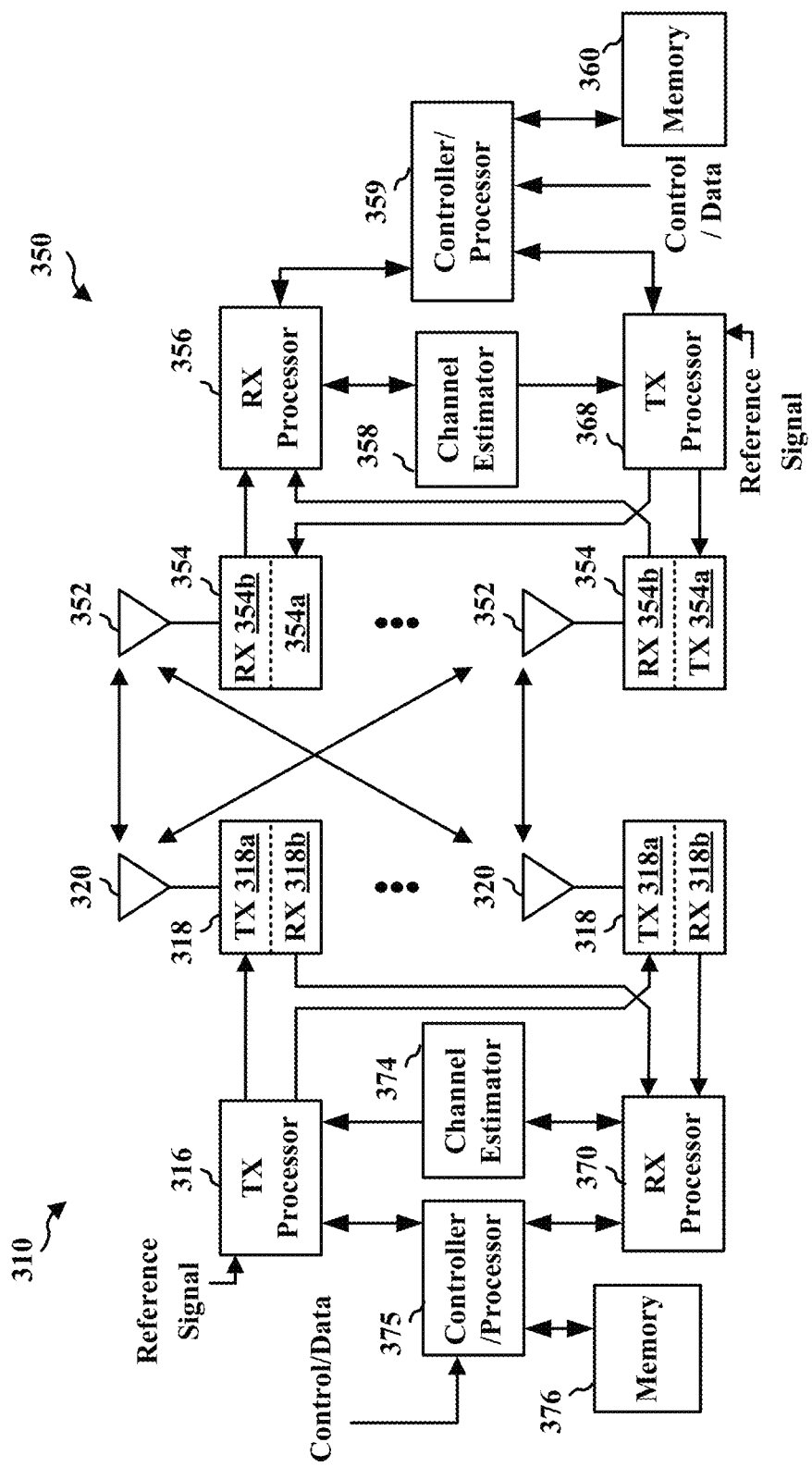
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the overlapping uplink transmission component 198 of FIG. 1.

At least one of the TX processor 316, the RX processor 370, and the controller/processor 375 may be configured to perform aspects in connection with the signaling component 199 of FIG. 1.

Some wireless communication systems may support communications between a UE and a base station on multiple aggregated CCs (also referred to as "carrier aggregation"). In some examples, a UE may be configured to transmit uplink signals on different carriers. For example, the UE may be configured to transmit uplink control information (e.g., PUCCH) on a primary CC (PCC) and may be configured to transmit uplink data (e.g., PUSCH) on a secondary CC (SCC).

Figure 4A:
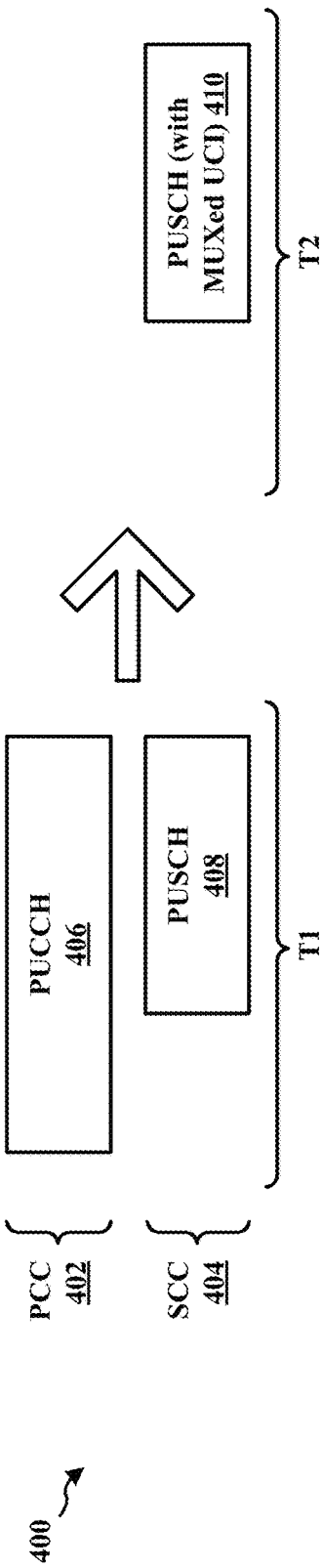
FIG. 4A is a diagram illustrating a UE applying a non-simultaneous overlapping uplink transmission mode to an overlapping uplink transmission, in accordance with the teachings disclosed herein.
Figure 4B:
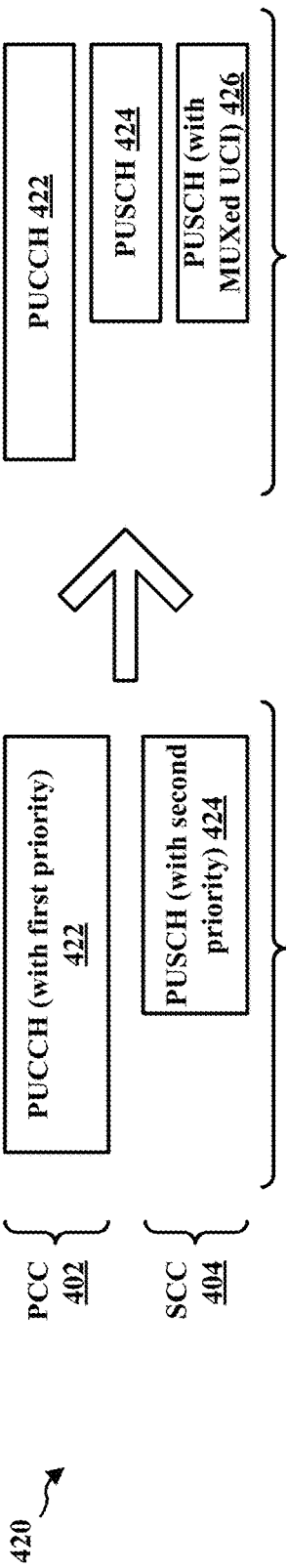
FIG. 4B is a diagram illustrating a UE applying another non-simultaneous overlapping uplink transmission mode to an overlapping uplink transmission, in accordance with the teachings disclosed herein.
Figure 4C:
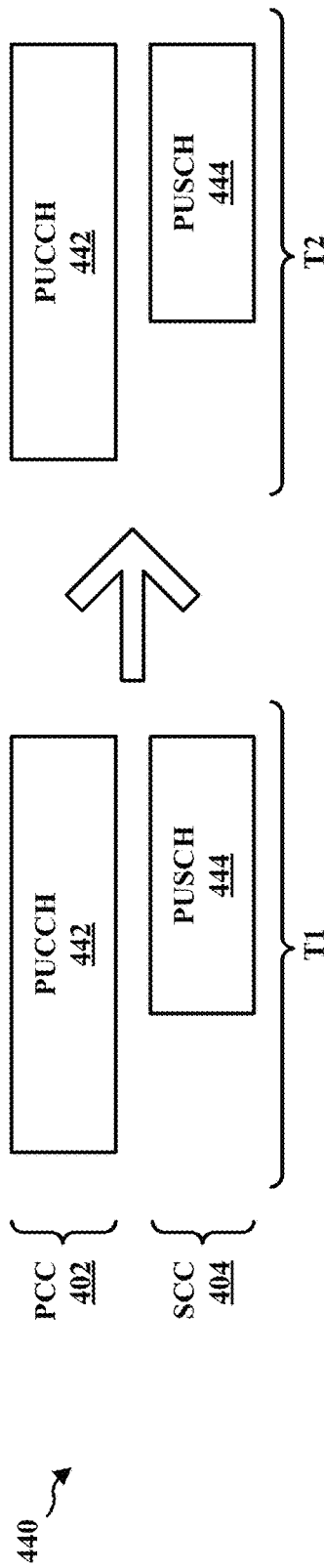
FIG. 4C is a diagram illustrating a UE applying a simultaneous overlapping uplink transmission mode to an overlapping uplink transmission, in accordance with the teachings disclosed herein.

In some examples, the uplink control information on the PCC may overlap with the uplink data on the SCC. For example, the uplink control information and the uplink data may overlap in a time domain. FIGS. 4A, 4B, and 4C depict examples in which an uplink control information transmission overlaps with an uplink data transmission.

In some examples, when a UE detects an occurrence of an overlapping uplink transmission (e.g., when an uplink control information transmission overlaps with an uplink data transmission in the time domain), the UE may be configured to multiplex the uplink control information on to the uplink data (e.g., may be configured to apply a multiplex-based transmission mode).

FIG. 4A depicts an illustration 400 in which a UE may be configured to transmit PUCCH 406 and PUSCH 408 at a time T1. As shown in FIG. 4A, the PUCCH 406 and the PUSCH 408 are configured for transmission on different carriers. For example, the PUCCH 406 is configured for transmission on a PCC 402 and the PUSCH 408 is configured for transmission on an SCC 404. The PCC 402 may be a component carrier configured to transmit uplink control information. The SCC 404 may be any component carrier that is different than the PCC 402.

In the illustrated example of FIG. 4A, the UE may multiplex the uplink control information of the PUCCH 406 on to the uplink data of the PUSCH 408 into a multiplexed PUSCH 410. The UE may then transmit the multiplexed PUSCH 410, which includes the uplink control information of the PUCCH 406, on the SCC 404 at time T2.

In some examples, when a UE detects an occurrence of an overlapping uplink transmission, the UE may be configured to modify the overlapping uplink transmission based on priorities associated with the uplink transmissions (e.g., may be configured to apply a priority-based transmission mode).

FIG. 4B depicts an illustration 420 in which a UE may be configured to transmit PUCCH 422 and PUSCH 424 at a time T1. Similar to the example of FIG. 4A, the PUCCH 422 and the PUSCH 424 are configured for transmission on different carriers. For example, the PUCCH 422 is configured for transmission on the PCC 402 and the PUSCH 424 is configured for transmission on the SCC 404. In the illustrated example, the PUCCH 422 is associated with a first priority and the PUSCH 424 is associated with a second priority. In some examples, the priorities may be the same. In some examples, the priorities may be different.

In the illustrated example of FIG. 4B, when the priorities of the PUCCH 422 and the PUSCH 424 are different, the UE may drop the transmission with a lower priority (e.g., drop the transmission that is of less importance). For example, if the first priority associated with the PUCCH 422 is of higher priority than the second priority associated with the PUSCH 424, then the UE may drop the PUSCH 424 (associated with the lower priority). In such examples, the UE may transmit the PUCCH 422 on the PCC 402 at the time T2.

In other examples in which the second priority associated with the PUSCH 424 is of higher priority than the first priority associated with the PUCCH 422, the UE may drop the PUCCH 422 (associated with the lower priority). In such examples, the UE may transmit the PUSCH 424 on the SCC 404 at the time T2.

In other examples in which the first priority and the second priority are the same (e.g., the PUCCH 422 and the PUSCH 424 are associated with the same priorities), the UE may apply multiplexing. For example, the UE may multiplex the uplink control information of the PUCCH 422 on to the uplink data of the PUSCH 424 into a multiplexed PUSCH 426. The UE may then transmit the multiplexed PUSCH 426 on the SCC 404 at the time T2.

In some examples, the UE may be capable of simultaneous (or "parallel") transmissions of the uplink control information and the uplink data. For example, FIG. 4C depicts an illustration 440 in which a UE may be configured to transmit PUCCH 442 and PUSCH 444 at a time T1. Similar to the examples of FIGS. 4A and 4B, the PUCCH 442 and the PUSCH 444 are configured for transmission on different carriers. For example, the PUCCH 442 is configured for transmission on the PCC 402 and the PUSCH 444 is configured for transmission on the SCC 404.

In the illustrated example of FIG. 4C, the UE may simultaneously transmit the PUCCH 442 on the PCC 402 at the time T2 and the PUSCH 444 on the SCC at the time T2.

In the illustrated examples of FIGS. 4A and 4B, the UE applies a non-simultaneous overlapping uplink transmission mode to the overlapping uplink transmission. For example, in FIG. 4A, the UE multiplexes the uplink control information of the PUCCH 406 and the uplink data of the PUSCH 408 into a multiplexed PUSCH 410 that is transmitted. In the example of FIG. 4B, the UE transmits the PUCCH 422, transmits the PUSCH 424, or transmits the multiplexed PUSCH 426.

In contrast, in the example of FIG. 4C, the UE is capable of simultaneously transmitting the uplink control information and the uplink data. For example, the UE transmits the PUCCH 442 on the PCC 402 and transmits the PUSCH 444 on the SCC 404.

Aspects presented herein enable wireless communication devices, such as a UE, to apply a configured overlapping uplink transmission mode to instances of overlapping uplink transmissions (as shown at time T1 of FIGS. 4A, 4B, and 4C). For example, techniques disclosed herein receive an overlapping uplink transmission configuration from a base station that configures the overlapping uplink transmission mode that the UE is to apply when an occurrence of an overlapping uplink transmission is detected. In some examples, the overlapping uplink transmission configuration may be based on a capability of the UE. For example, the UE may be a legacy UE that is capable of performing multiplex-based techniques (as shown in FIG. 4A) or priority-based techniques (as shown in FIG. 4B) when an overlapping uplink transmission occurrence is detected. In other examples, the UE may be capable of performing simultaneous transmissions (as shown in FIG. 4C) in addition to the multiplex-based techniques and/or priority-based techniques. Thus, when the UE is capable of simultaneous overlapping uplink transmission modes and non-simultaneous overlapping uplink transmission modes, it may be beneficial to configure the UE to apply an overlapping uplink transmission mode to an overlapping uplink transmission when an occurrence of an overlapping uplink transmission is detected.

Figure 5:
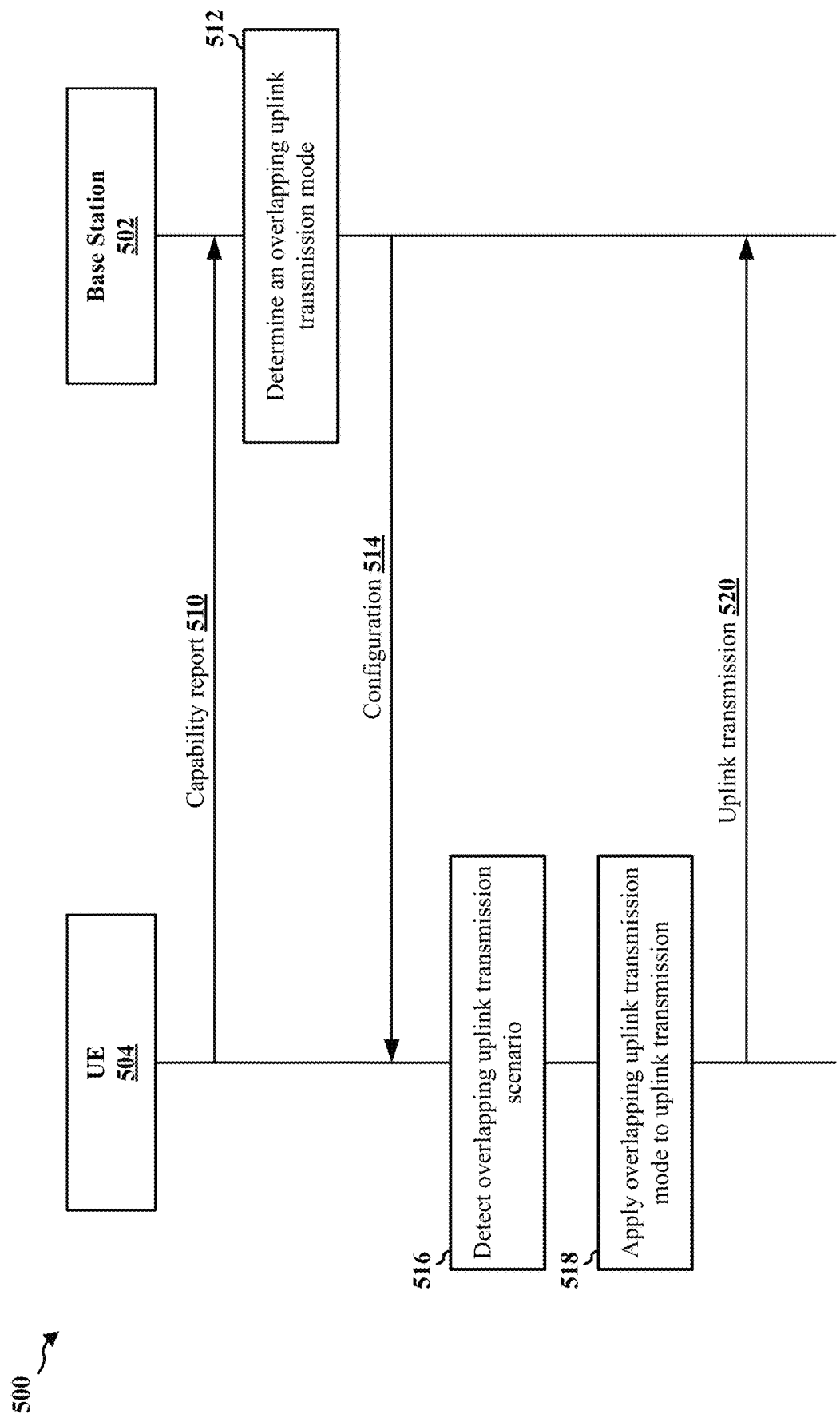
FIG. 5 is an example communication flow between a base station and a UE, in accordance with the teachings disclosed herein.

FIG. 5 illustrates an example communication flow 500 between a base station 502 and a UE 504, as presented herein. In the illustrated example, the communication flow 500 facilitates the UE 504 transmitting an uplink transmission by applying an overlapping uplink transmission mode configured by the base station 502. Aspects of the base station 502 may be implemented by the base station 102/180 of FIG. 1 and/or the base station 310 of FIG. 3. Aspects of the UE 504 may be implemented by the UE 104 of FIG. 1 and/or the UE 350 of FIG. 3. Although not shown in the illustrated example of FIG. 5, it may be appreciated that in additional or alternative examples, the base station 502 may be in communication with one or more other base stations or UEs, and/or the UE 504 may be in communication with one or more other base stations or UEs.

In some examples, the UE 504 may transmit a capability report 510 that is received by the base station 502. The capability report 510 may indicate whether the UE 504 is a UE capable of simultaneous and non-simultaneous overlapping uplink transmission modes or a UE capable of non-simultaneous overlapping uplink transmission modes (e.g., a legacy UE). In some examples, the UE 504 may transmit the capability report 510 after performing a random access channel (RACH) procedure, for example, with the base station 502.

The base station 502 may determine, at 512, an overlapping uplink transmission mode to configure the UE 504. In some examples, the base station 502 may determine the overlapping uplink transmission mode based, at least in part, on the capability report 510. For example, the capability report 510 may indicate that the UE 504 is a legacy UE. In such examples, the base station 502 may determine, at 512, to configure the UE 504 with a non-simultaneous overlapping uplink transmission mode, such as a multiplex-based transmission mode (as shown in FIG. 4A) or a priority-based transmission mode (as shown in FIG. 4B).

In some examples, the capability report 510 may indicate that the UE 504 is capable of simultaneous and non-simultaneous overlapping uplink transmission modes. In some such examples, the base station 502 may determine, at 512, to configure the UE 504 with a simultaneous overlapping uplink transmission mode or a non-simultaneous overlapping uplink transmission mode. In some examples in which the base station 502 determines to configure the UE 504 with the non-simultaneous overlapping uplink transmission mode, the base station 502 may also determine to configure the UE 504 with the multiplex-based transmission mode or the priority-based transmission mode.

In the illustrated example of FIG. 5, the base station 502 transmits a configuration 514 that is received by the UE 504. The base station 502 may transmit the configuration 514 using RRC signaling, through a medium access control-control element (MAC-CE), or through DCI. The configuration 514 may configure the UE 504 to apply an overlapping uplink transmission mode to occurrences of overlapping uplink transmissions.

In some examples, the configuration 514 may include a one-bit indicator. For example, a first value (e.g., "0") may configure the UE 504 to apply a non-simultaneous overlapping uplink transmission mode. In some such examples, the UE 504 may determine whether to apply a multiplex-based transmission mode or a priority-based transmission mode. A second value (e.g., "1") may configure the UE 504 to apply a simultaneous overlapping uplink transmission mode.

In some examples, the configuration 514 may include a two-bit indicator. For example, a first value (e.g., "00") may configure the UE 504 to apply a multiplex-based transmission mode, a second value (e.g., "01") may configure the UE 504 to apply a priority-based transmission mode, and a third value (e.g., "10") may configure the UE 504 to apply a simultaneous overlapping uplink transmission mode.

In the illustrated example, the UE 504 detects, at 516, an overlapping uplink transmission scenario. For example, the UE 504 may detect an occurrence of an uplink control information transmission on a PCC and an uplink data transmission on an SCC that are overlapping in a time domain, as shown at time T1 of FIGS. 4A, 4B, and 4C.

As shown in FIG. 5, the UE 504 may apply, at 518, an overlapping uplink transmission mode to an uplink transmission. The UE 504 may apply, at 518, the overlapping uplink transmission mode based on the configuration 514. For example, the UE 504 may apply a non-simultaneous overlapping uplink transmission mode, such as a multiplex-based transmission mode or a priority-based transmission mode, or may apply a simultaneous overlapping uplink transmission mode.

In some examples, the UE 504 may be configured to apply a multiplex-based transmission mode. For example, and referring to the example of FIG. 4A, the UE 504 may multiplex uplink control information of the PUCCH 406 on to the PUSCH 408 to generate a multiplexed PUSCH 410 including the uplink control information. The UE 504 may then transmit uplink transmission 520 that is received by the base station 502. In some such examples, the uplink transmission 520 may include the multiplexed PUSCH 410.

In some examples, the UE 504 may be configured to apply a priority-based transmission mode. For example, and referring to the example of FIG. 4B, the UE 504 may compare priorities of the PUCCH 422 and the PUSCH 424 and modify the overlapping uplink transmission (at time T1) based on the priorities. The UE 504 may then transmit uplink transmission 520 that is received by the base station 502. The uplink transmission 520 may include the modified overlapping uplink transmission (at time T2).

For example, the UE 504 may determine to drop the PUSCH 424 when the second priority is lower than the first priority. In some such examples, the uplink transmission 520 may include the PUCCH 422. In some examples, the UE 504 may determine to drop the PUCCH 422 when the first priority is lower than the second priority. In some such examples, the uplink transmission 520 may include the PUSCH 424. In some examples, the UE 504 may determine to multiplex the uplink control information of the PUCCH 422 on to the uplink data of the PUSCH 424 when the first priority and the second priority are the same (i.e., are equal). In some such examples, the uplink transmission 520 may include the multiplexed PUSCH 426.

In some examples, the UE 504 may be configured to apply the simultaneous overlapping uplink transmission mode. For example, and referring to the example of FIG. 4C, the UE 504 may determine to simultaneously transmit the uplink control information and the uplink data on the different, respective carriers. For example, the uplink transmission 520 may include the PUCCH 442 on the PCC 402 and include the PUSCH on the SCC 404.

Figure 6:
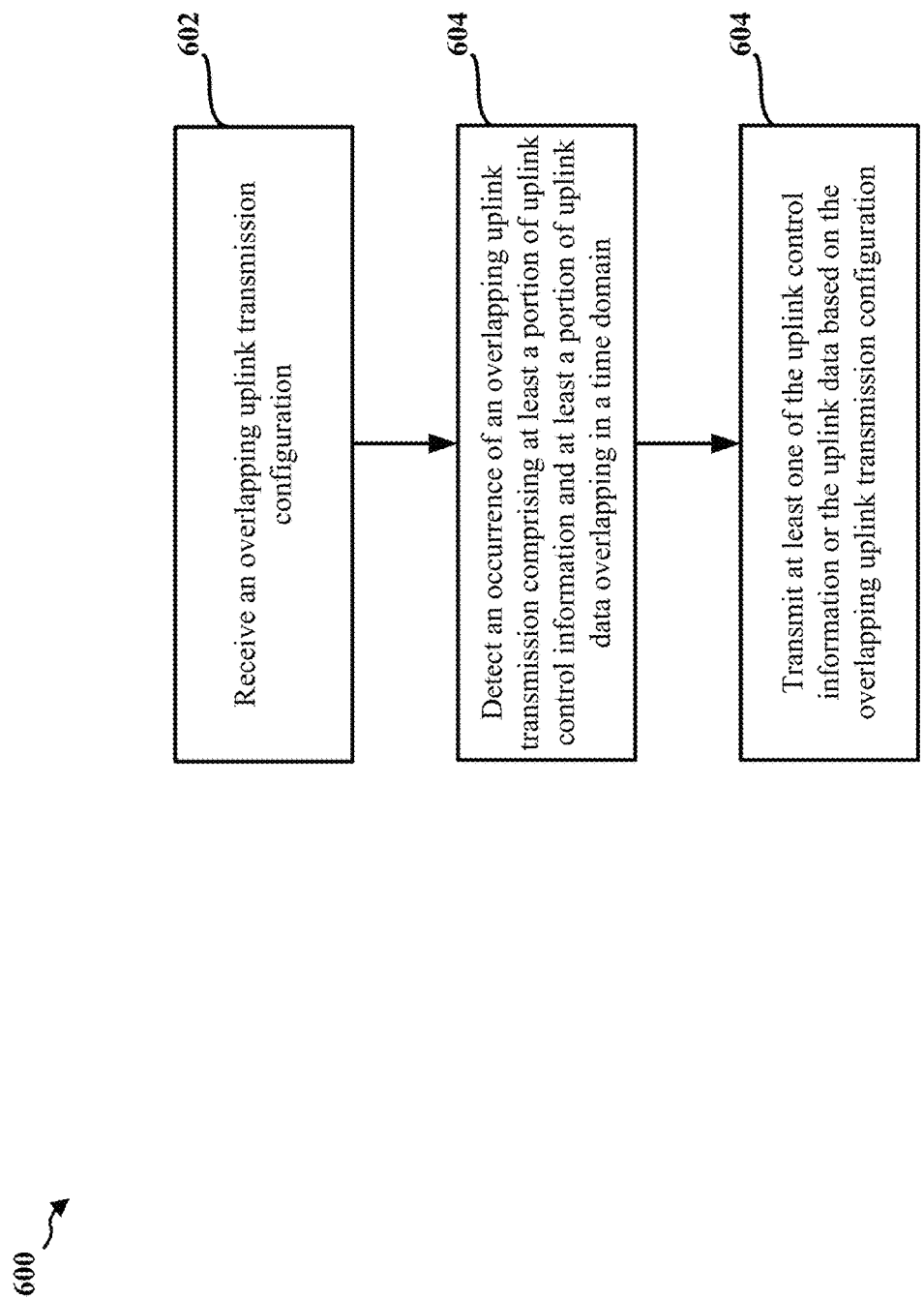
FIG. 6 is a flowchart of a method of wireless communication at a UE, in accordance with the teachings disclosed herein.

FIG. 6 is a flowchart 600 of a method of wireless communication. The method may be performed by a UE (e.g., the UE 104, the UE 350, and/or an apparatus 802 of FIG. 8). The method may facilitate improving communications by configuring the UE to apply an overlapping uplink transmission mode when an occurrence of an overlapping uplink transmission occurs.

At 602, the UE receives, from a base station, an overlapping uplink transmission configuration, as described in connection with the configuration 514 of FIG. 5. The receiving of the overlapping uplink transmission configuration, at 602, may be performed by a configuration receiving component 840 of the apparatus 802 of FIG. 8. For example, the UE may receive the overlapping uplink transmission configuration via at least one of RRC signaling, a MAC-CE, or DCI.

At 604, the UE detects an occurrence of an overlapping uplink transmission including at least a portion of uplink control information and at least a portion of uplink data overlapping in a time domain, as described in connection with 516 of FIG. 5. The detecting of the occurrence of an overlapping uplink transmission, at 604, may be performed by an overlap monitoring component 842 of the apparatus 802 of FIG. 8.

At 606, the UE transmits at least one of the uplink control information or the uplink data based on the overlapping uplink transmission configuration, as described in connection with the uplink transmission 520 of FIG. 5. The transmitting of the at least one of the uplink control information or the uplink data, at 606, may be performed by an uplink transmission component 844 of the apparatus 802 of FIG. 8.

Figure 7:
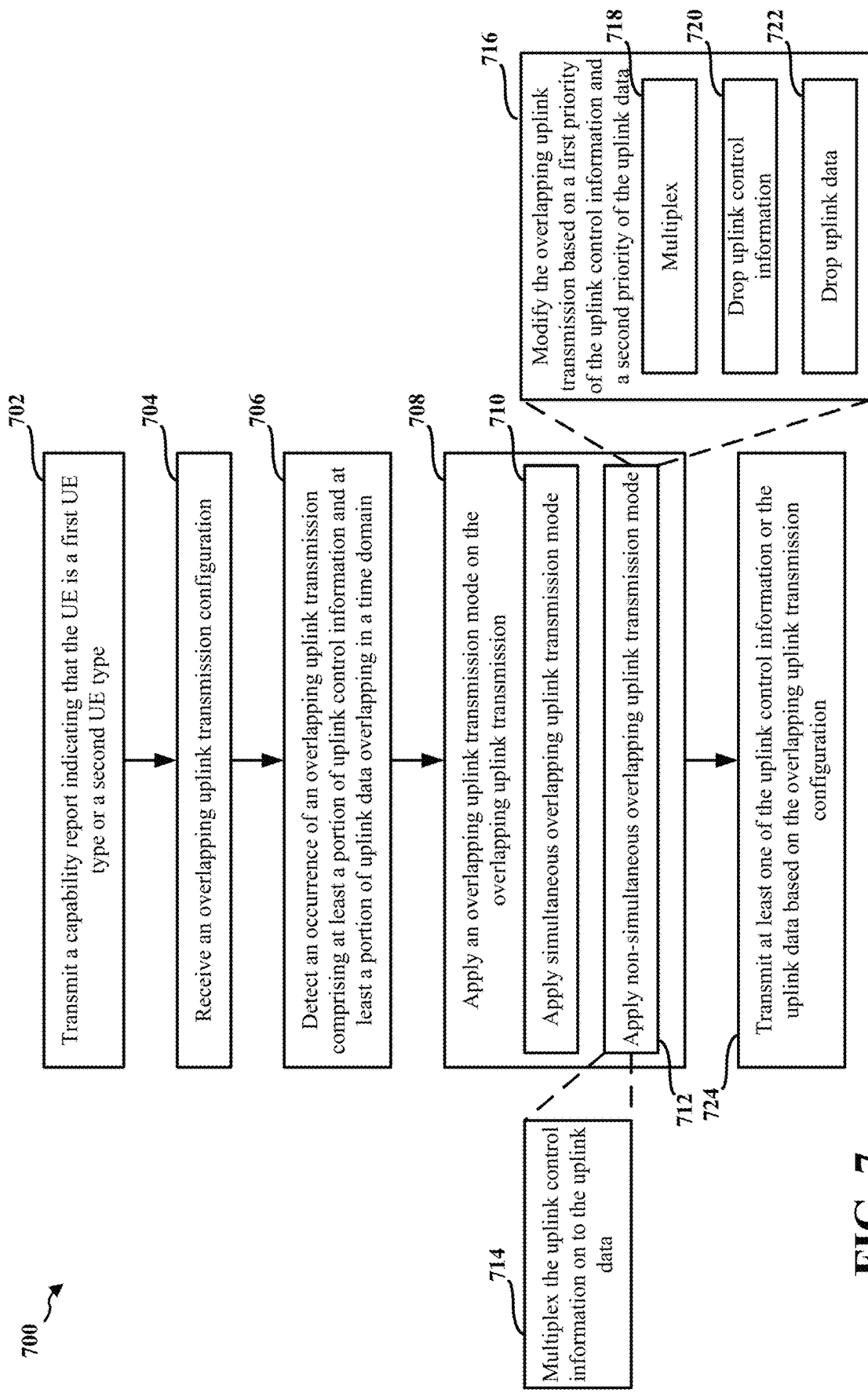
FIG. 7 is a flowchart of a method of wireless communication at a UE, in accordance with the teachings disclosed herein.

FIG. 7 is a flowchart 700 of a method of wireless communication. The method may be performed by a UE (e.g., the UE 104, the UE 350, and/or an apparatus 802 of FIG. 8). The method may facilitate improving communications by configuring the UE to apply an overlapping uplink transmission mode when an occurrence of an overlapping uplink transmission occurs.

At 704, the UE receives, from a base station, an overlapping uplink transmission configuration, as described in connection with the configuration 514 of FIG. 5. The receiving of the overlapping uplink transmission configuration, at 704, may be performed by a configuration receiving component 840 of the apparatus 802 of FIG. 8. For example, the UE may receive the overlapping uplink transmission configuration via at least one of RRC signaling, a MAC-CE, or DCI.

At 706, the UE detects an occurrence of an overlapping uplink transmission including at least a portion of uplink control information and at least a portion of uplink data overlapping in a time domain, as described in connection with 516 of FIG. 5. The detecting of the occurrence of an overlapping uplink transmission, at 706, may be performed by an overlap monitoring component 842 of the apparatus 802 of FIG. 8.

At 724, the UE transmits at least one of the uplink control information or the uplink data based on the overlapping uplink transmission configuration, as described in connection with the uplink transmission 520 of FIG. 5. The transmitting of the at least one of the uplink control information or the uplink data, at 724, may be performed by an uplink transmission component 844 of the apparatus 802 of FIG. 8.

In some examples, the overlapping uplink transmission configuration may be based on one or more capabilities associated with the UE. For example, at 702, the UE may transmit a capability report indicating that the UE is a first UE type or a second UE type, as described in connection with the capability report 510 of FIG. 5. The transmitting of the capability report, at 702, may be performed by a capabilities component 846 of the apparatus 802 of FIG. 8. In some examples, the UE may transmit the capability report after performing a RACH procedure.

In some examples, a UE that is the first UE type may have the capability to apply a simultaneous overlapping uplink transmission mode (e.g., as shown in FIG. 4C) and a non-simultaneous overlapping uplink transmission mode (e.g., as shown in FIGS. 4A and 4B) on the overlapping uplink transmission. A UE that is the second UE type may have the capability to apply the non-simultaneous overlapping uplink transmission mode (e.g., as shown in FIGS. 4A and 4B) on the overlapping uplink transmission. In some examples, the overlapping uplink configuration transmission received (e.g., at 704) may be based at least in part on the capability report.

At 708, the UE may apply an overlapping uplink transmission mode on the overlapping uplink transmission, as described in connection with 518 of FIG. 5. The applying of the overlapping uplink transmission mode on the overlapping uplink transmission, at 708, may be performed by an application component 848 of the apparatus 802 of FIG. 8.

In some examples, the UE may include a first UE type and the overlapping uplink transmission configuration (e.g., received at 704) may configure the UE to apply the simultaneous overlapping uplink transmission mode on the overlapping uplink transmission. For example, at 710, the UE may apply the simultaneous overlapping uplink transmission mode on the overlapping uplink transmission by transmitting (e.g., at 724) the uplink control information using a first CC and by transmitting (e.g., at 724) the uplink data using a second CC, as described in connection with the PUCCH 442 and the PUSCH 444 of FIG. 4C. The applying of the simultaneous overlapping uplink transmission mode, at 710, may be performed by a simultaneous component 850 of the apparatus 802 of FIG. 8.

In some examples, the UE may include a first UE type and the overlapping uplink transmission configuration (e.g., received at 704) may configure the UE to apply the non-simultaneous overlapping uplink transmission mode on the overlapping uplink transmission. In some examples, the UE may include a second UE type and the overlapping uplink transmission configuration (e.g., received at 704) may configure the UE to apply the non-simultaneous overlapping uplink transmission mode on the overlapping uplink transmission. For example, at 712, the UE may apply a non-simultaneous overlapping uplink transmission mode by applying a multiplex-based transmission mode or a priority-based transmission mode, as described in connection with FIGS. 4A and 4B. The applying of the non-simultaneous overlapping uplink transmission mode, at 712, may be performed by a non-simultaneous component 852 of the apparatus 802 of FIG. 8.

In some examples, the UE may apply the multiplex-based transmission mode by applying multiplexing to occurrences of overlapping uplink transmissions. For example, at 714, the UE may apply the non-simultaneous overlapping transmission mode on the overlapping uplink transmission by multiplexing the uplink control information on to the uplink data, as described in connection with the multiplexed PUSCH 410 of FIG. 4A. The multiplexing of the uplink control information on to the uplink data, at 714, may be performed by a multiplex component 854 of the apparatus 802 of FIG. 8. The UE may transmit (e.g., at 724) the uplink data with the multiplexed uplink control information.

In some examples, the UE may apply the priority-based transmission mode by comparing priorities of the uplink control information and the uplink data. For example, at 716, the UE may modify the overlapping uplink transmission based on a first priority of the uplink control information and a second priority of the uplink data to apply the non-simultaneous overlapping transmission mode on the overlapping uplink transmission, as described in connection with FIG. 4B. The UE may transmit (e.g., at 724) the modified overlapping uplink transmission.

In some examples, the UE may modify the overlapping uplink transmission by multiplexing, at 718, the uplink control information onto the uplink data when the first priority and the second priority are equal. The UE may transmit (e.g., at 724) the uplink data with the multiplexed uplink control information, such as the multiplexed PUSCH 426 of FIG. 4B.

In some examples, the UE may modify the overlapping uplink transmission by dropping, at 720, the uplink control information when the first priority is lower than the second priority. The UE may transmit (e.g., at 724) the uplink data with the dropped uplink control information, such as the PUSCH 424 of FIG. 4B.

In some examples, the UE may modify the overlapping uplink transmission by dropping, at 722, the uplink data when the second priority is lower than the first priority. The UE may transmit (e.g., at 724) the uplink control information with the dropped uplink data, such as the PUCCH 422 of FIG. 4B.

Figure 8:
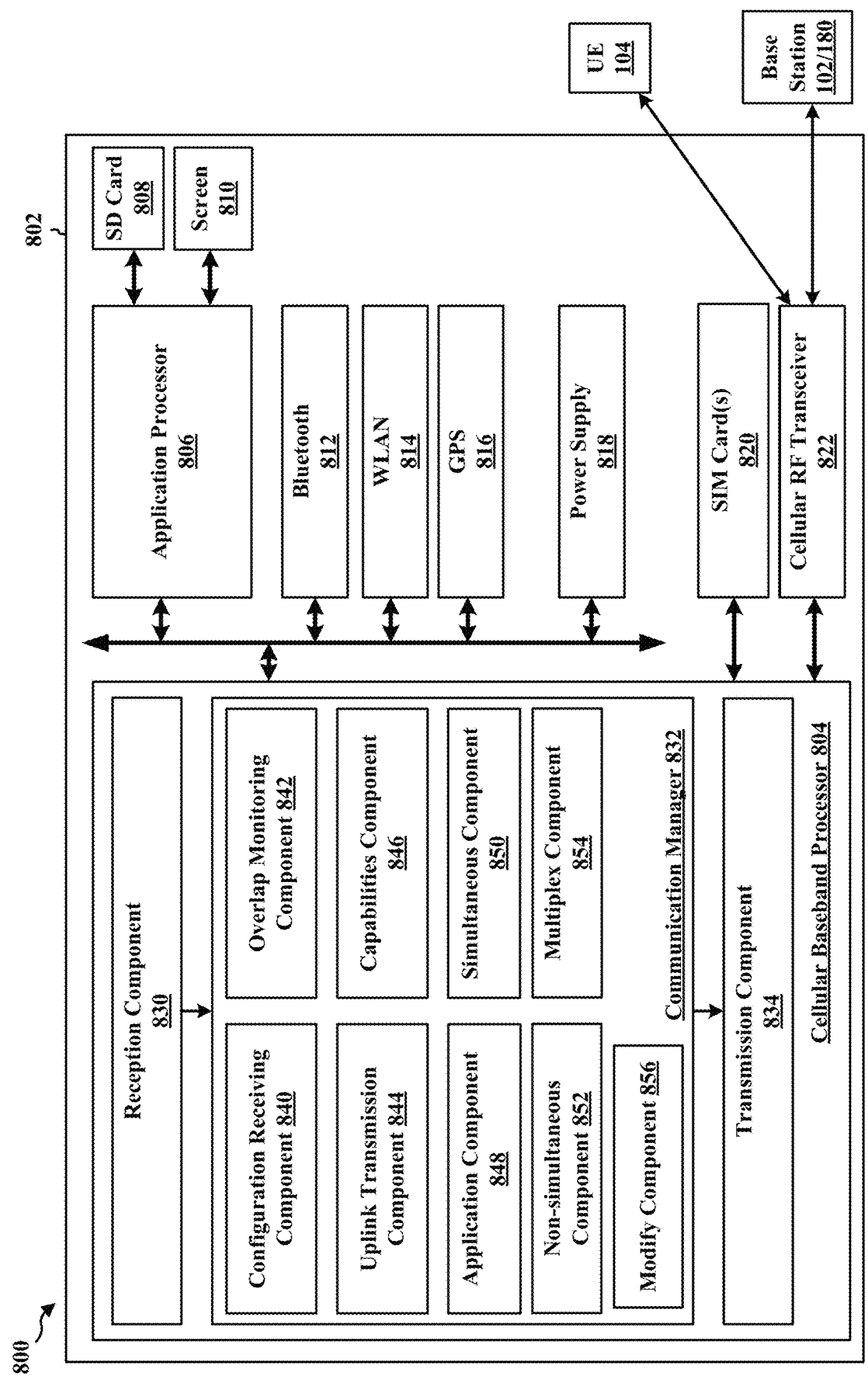
FIG. 8 is a diagram illustrating an example of a hardware implementation for an example apparatus, in accordance with the teachings disclosed herein.

The modifying of the overlapping uplink transmission, at 716, 718, 720, 722, may be performed by a modify component 856 of the apparatus 802 of FIG. 8.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see the UE 350 of FIG. 3) and include the additional modules of the apparatus 802.

The communication manager 832 includes a configuration receiving component 840 that is configured to receive an overlapping uplink transmission configuration, for example, as described in connection with 602 of FIG. 6 and/or 704 of FIG. 7.

The communication manager 832 also includes an overlap monitoring component 842 that is configured to detect an occurrence of an overlapping uplink transmission including at least a portion of uplink control information and at least a portion of uplink data overlapping in a time domain, for example, as described in connection with 604 of FIG. 6 and/or 706 of FIG. 7.

The communication manager 832 also includes an uplink transmission component 844 that is configured to transmit at least one of the uplink control information or the uplink data based on the overlapping uplink transmission configuration, for example, as described in connection with 606 of FIG. 6 and/or 724 of FIG. 7.

The communication manager 832 also includes a capabilities component 846 that is configured to transmit a capability report indicating that the UE is a first UE type or a second UE type, for example, as described in connection with 702 of FIG. 7.

The communication manager 832 also includes an application component 848 that is configured to apply an overlapping uplink transmission mode on the overlapping uplink transmission, for example, as described in connection with 708 of FIG. 7.

The communication manager 832 also includes a simultaneous component 850 that is configured to apply simultaneous overlapping uplink transmission mode, for example, as described in connection with 710 of FIG. 7.

The communication manager 832 also includes a non-simultaneous component 852 that is configured to apply non-simultaneous overlapping uplink transmission mode, for example, as described in connection with 712 of FIG. 7.

The communication manager 832 also includes a multiplex component 854 that is configured to multiplex the uplink control information on to the uplink data, for example, as described in connection with 714 of FIG. 7.

The communication manager 832 also includes a modify component 856 that is configured to modify the overlapping uplink transmission based on a first priority of the uplink control information and a second priority of the uplink data, for example, as described in connection with 716 of FIG. 7. The example modify component 856 may also be configured to multiplex the uplink control information on to the uplink data when the first priority and the second priority are equal, for example, as described in connection with 718 of FIG. 7. The example modify component 856 may also be configured to drop the uplink control information when the first priority is lower than the second priority, for example, as described in connection with 720 of FIG. 7. The example modify component 856 may also be configured to drop the uplink data when the second priority is lower than the first priority, for example, as described in connection with 722 of FIG. 7.

The apparatus may include additional components that perform each of the blocks of the algorithm in the flowcharts of FIGS. 6 and/or 7. As such, each block in the flowcharts of FIGS. 6 and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving, from a base station, an overlapping uplink transmission configuration. The example apparatus 802 also includes means for detecting an occurrence of an overlapping uplink transmission comprising at least a portion of uplink control information and at least a portion of uplink data overlapping in a time domain. The example apparatus 802 also includes means for transmitting at least one of the uplink control information or the uplink data based on the overlapping uplink transmission configuration.

In another configuration, the example apparatus 802 also includes means for transmitting, to the base station, a capability report indicating that the UE is a first UE type or a second UE type.

In another configuration, the example apparatus 802 also includes means for multiplexing the uplink control information on to the uplink data. The example apparatus 802 also includes means for transmitting the uplink data with the multiplexed uplink control information.

In another configuration, the example apparatus 802 also includes means for modifying the overlapping uplink transmission based on a first priority of the uplink control information and a second priority of the uplink data. The example apparatus 802 also includes means for transmitting the modified overlapping uplink transmission.

In another configuration, the example apparatus 802 also includes means for multiplexing the uplink control information on to the uplink data when the first priority and the second priority are equal. The example apparatus 802 also includes means for dropping the uplink control information when the first priority is lower than the second priority. The example apparatus 802 also includes means for dropping the uplink data when the second priority is lower than the first priority.

In another configuration, the example apparatus 802 also includes means for transmitting the capability report after performing a RACH procedure.

In another configuration, the example apparatus 802 also includes means for receiving the overlapping uplink transmission configuration via at least one of RRC signaling, a MAC-CE, or DCI.

The means may be one or more of the components of the apparatus 802 configured to perform the functions recited by the means. As described supra, the apparatus 802 may include the TX processor 368, the RX processor 356, and the controller/processor 359. As such, in one configuration, the means may be the TX processor 368, the RX processor 356, and the controller/processor 359 configured to perform the functions recited by the means.

Figure 9:
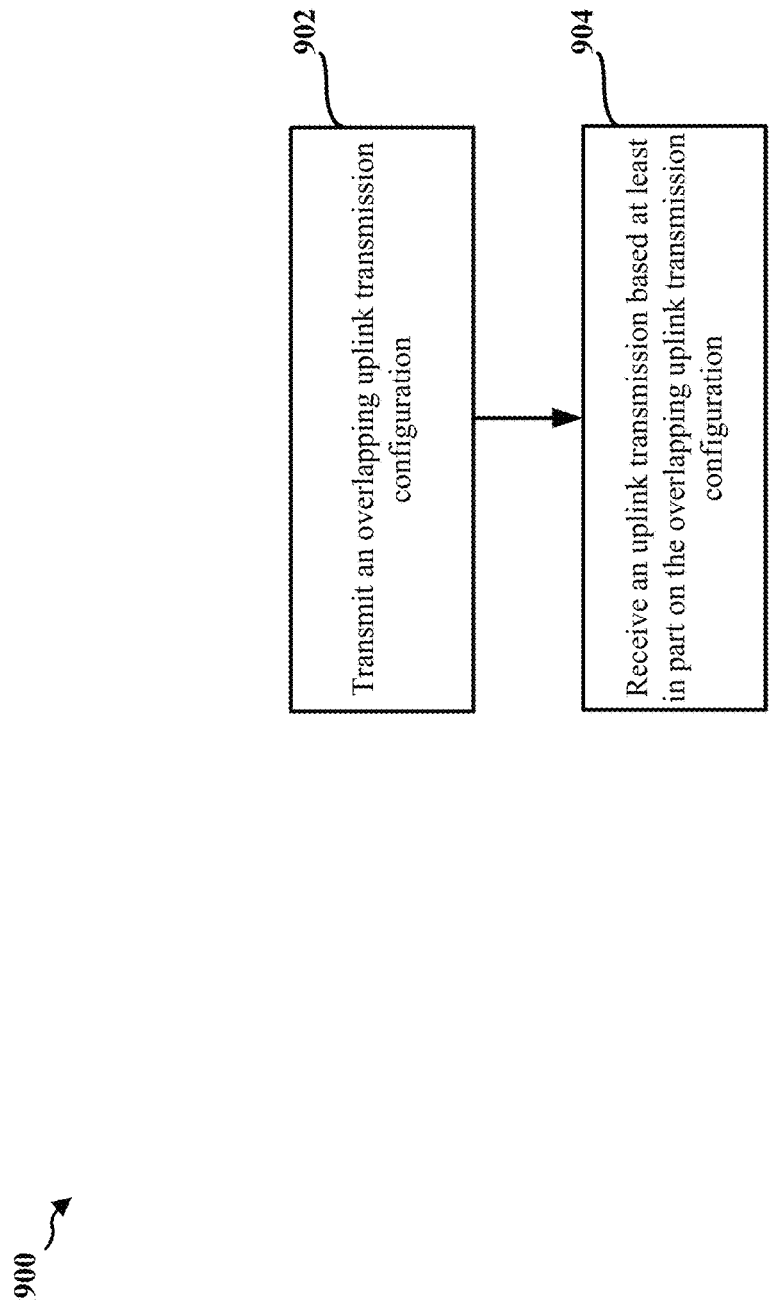
FIG. 9 is a flowchart of a method of wireless communication at a base station, in accordance with the teachings disclosed herein.

FIG. 9 is a flowchart 900 of a method of wireless communication. The method may be performed by a base station (e.g., the base station 102/180, the base station 310, and/or an apparatus 1102 of FIG. 11). The method may facilitate improving communications by configuring the UE to apply an overlapping uplink transmission mode when an occurrence of an overlapping uplink transmission occurs.

At 902, the base station transmits, to the UE, an overlapping uplink transmission configuration, as described in connection with the configuration 514 of FIG. 5. The transmitting of the overlapping uplink transmission configuration, at 902, may be performed by configuration component 1140 of the apparatus 1102 of FIG. 11. The base station may transmit the overlapping uplink transmission configuration using at least one of RRC signaling, a MAC-CE, or DCI.

At 904, the base station receives, from the UE, an uplink transmission based at least in part on the overlapping uplink transmission configuration, as described in connection with the uplink transmission 520 of FIG. 5. The receiving of the uplink transmission, at 904, may be performed by an uplink transmission component 1142 of the apparatus 1102 of FIG. 11.

Figure 10:
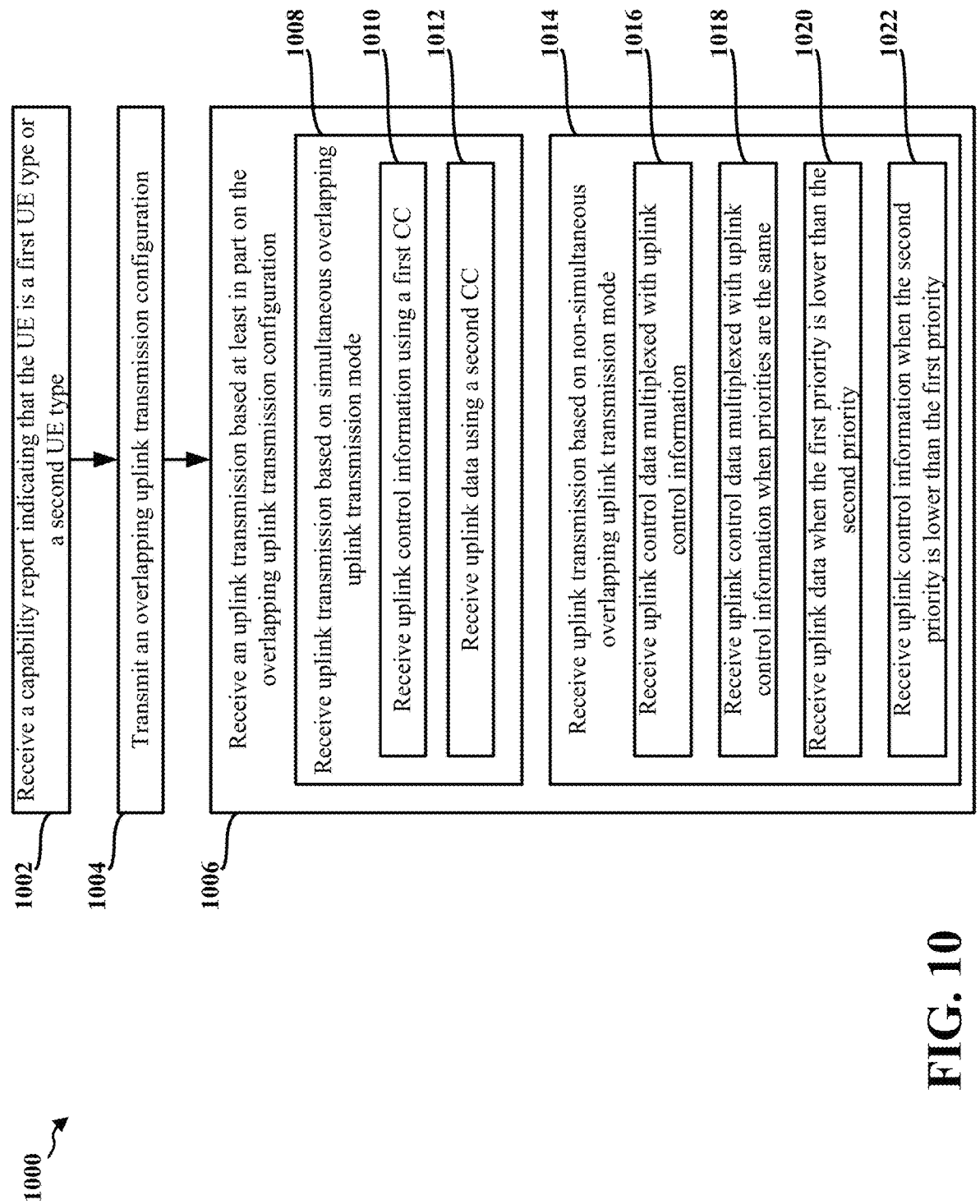
FIG. 10 is a flowchart of a method of wireless communication at a base station, in accordance with the teachings disclosed herein.

FIG. 10 is a flowchart 1000 of a method of wireless communication. The method may be performed by a base station (e.g., the base station 102/180, the base station 310, and/or an apparatus 1102 of FIG. 11). The method may facilitate improving communications by configuring the UE to apply an overlapping uplink transmission mode when an occurrence of an overlapping uplink transmission occurs.

At 1002, the base station may receive, from the UE, a capability report indicating that the UE is a first UE type or a second UE type, as described in connection with the capability report 510 of FIG. 5. The receiving of the capability report, at 1002, may be performed by capability component 1144 of the apparatus 1102 of FIG. 11. In some examples, the base station may receive the capability report after performing a RACH procedure.

At 1004, the base station transmits, to the UE, an overlapping uplink transmission configuration, as described in connection with the configuration 514 of FIG. 5. The transmitting of the overlapping uplink transmission configuration, at 1004, may be performed by configuration component 1140 of the apparatus 1102 of FIG. 11. The base station may transmit the overlapping uplink transmission configuration using at least one of RRC signaling, a MAC-CE, or DCI.

At 1006, the base station receives, from the UE, an uplink transmission based at least in part on the overlapping uplink transmission configuration, as described in connection with the uplink transmission 520 of FIG. 5. The receiving of the uplink transmission, at 1006, may be performed by an uplink transmission component 1142 of the apparatus 1102 of FIG. 11.

In some examples, a UE that is the first UE type may have the capability to apply a simultaneous overlapping uplink transmission mode (e.g., as shown in FIG. 4C) and a non-simultaneous overlapping uplink transmission mode (e.g., as shown in FIGS. 4A and 4B) on the overlapping uplink transmission. A UE that is the second UE type may have the capability to apply the non-simultaneous overlapping uplink transmission mode (e.g., as shown in FIGS. 4A and 4B) on the overlapping uplink transmission. In some examples, the overlapping uplink configuration transmission (e.g., at 1004) may be based at least in part on the capability report.

For example, the base station may transmit the overlapping uplink transmission configuration (e.g., at 1004) to configure the UE to apply the simultaneous overlapping uplink transmission mode on occurrences of overlapping uplink transmission when the capability report indicates that the UE is the first UE type. In some such examples, at 1008, the base station may receive the uplink transmission based on the simultaneous overlapping uplink transmission mode. For example, the base station may receive, at 1010, uplink control information using a first CC, such as the PUCCH 442 of FIG. 4C. The base station may receive, at 1012, uplink data using a second CC, such as the PUSCH 444 of FIG. 4C. The receiving of the uplink transmission based on the simultaneous overlapping uplink transmission mode, at 1008, 1010, and 1012, may be performed by a simultaneous component 1146 of the apparatus 1102 of FIG. 11.

In some examples, the base station may transmit the overlapping uplink transmission configuration (e.g., at 1004) to configure the UE to apply the non-simultaneous overlapping uplink transmission mode on occurrences of overlapping uplink transmission when the capability report indicates that the UE is the first UE type or the second UE type. In some such examples, at 1014, the base station may receive the uplink transmission based on the non-simultaneous overlapping uplink transmission mode, such as based on multiplexing or based on priority. For example, at 1016, the base station may receive uplink control data multiplexed with uplink control information, such as the example multiplexed PUSCH 410 of FIG. 4A. In some examples, the base station may receive, at 1018, uplink control data multiplexed with uplink control information when a first priority associated with uplink control information and a second priority associated with uplink data are equal, such as the example multiplexed PUSCH 426 of FIG. 4B. In some examples, the base station may receive, at 1020, uplink data when the first priority is lower than the second priority, such as the example PUSCH 424 of FIG. 4B. In some examples, the base station may receive, at 1022, uplink data when the second priority is lower than the first priority, such as the example PUCCH 422 of FIG. 4B. The receiving of the uplink transmission based on the non-simultaneous overlapping uplink transmission mode, at 1014, 1016, 1018, 1020, 1022, may be performed by a non-simultaneous component 1148 of the apparatus 1102 of FIG. 11.

Figure 11:
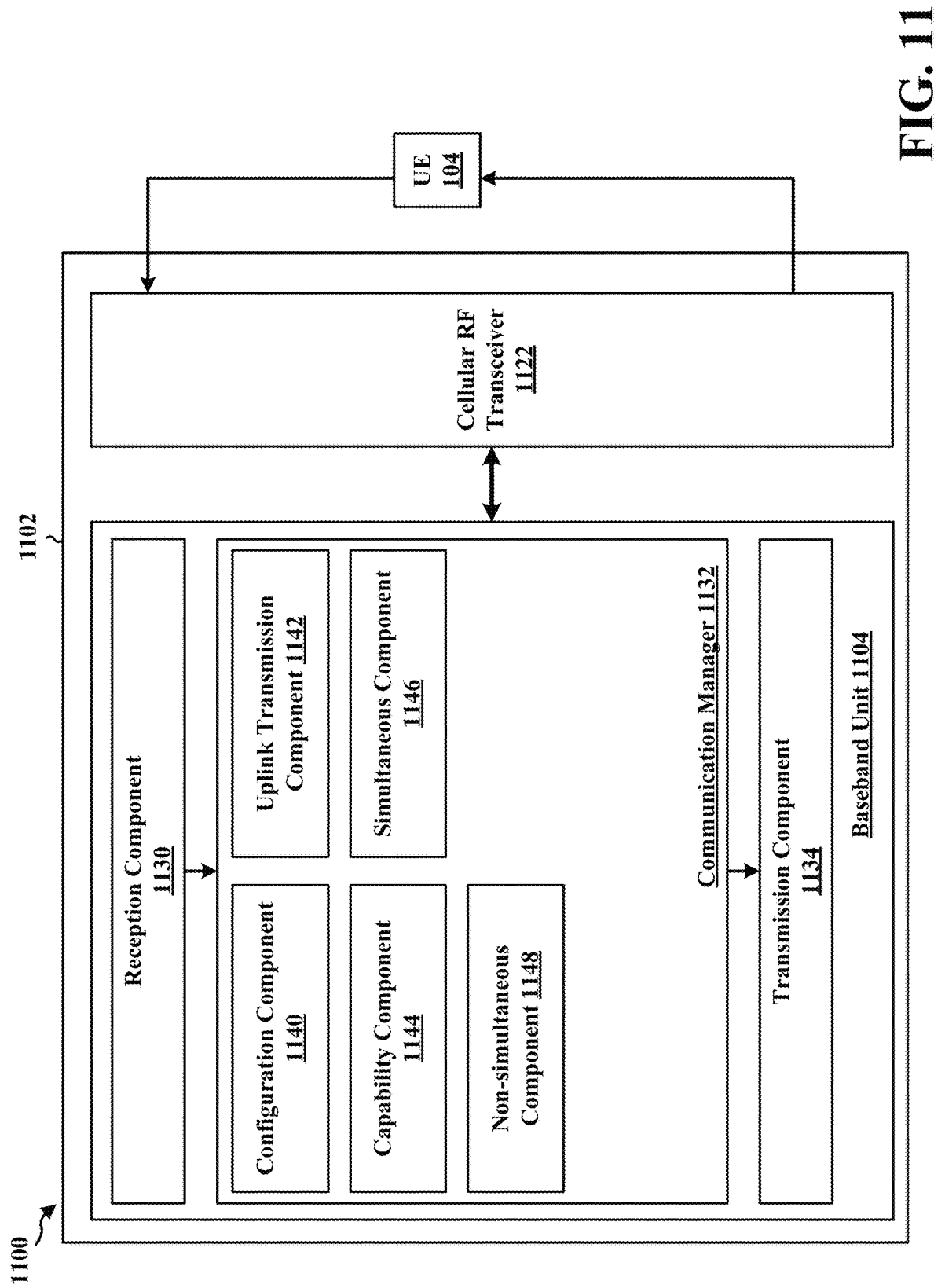
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a configuration component 1140 that is configured to transmit an overlapping uplink transmission configuration, for example, as described in connection with 902 of FIG. 9 and/or 1004 of FIG. 10.

The communication manager 1132 also includes an uplink transmission component 1142 that is configured to receive an uplink transmission based at least in part on the overlapping uplink transmission configuration, for example, as described in connection with 904 of FIG. 9 and/or 1006 of FIG. 10.

The communication manager 1132 also includes a capability component 1144 that is configured to receive a capability report indicating that the UE is a first UE type or a second UE type, for example, as described in connection with 1002 of FIG. 10.

The communication manager 1132 also includes a simultaneous component 1146 that is configured to receive uplink transmission based on simultaneous overlapping uplink transmission mode, for example, as described in connection with 1008 of FIG. 10. The example simultaneous component 1146 may also be configured to receive uplink control information using a first CC, for example, as described in connection with 1010 of FIG. 10. The example simultaneous component 1146 may also be configured to receive uplink data using a second CC, for example, as described in connection with 1012 of FIG. 10.

The communication manager 1132 also includes a non-simultaneous component 1148 that is configured to receive uplink transmission based on non-simultaneous overlapping uplink transmission mode, for example, as described in connection with 1014 of FIG. 10. The example non-simultaneous component 1148 may also be configured to receive uplink control data multiplexed with uplink control information, for example, as described in connection with 1016 of FIG. 10. The example non-simultaneous component 1148 may also be configured to receive uplink control data multiplexed with uplink control information when priorities are the same, for example, as described in connection with 1018 of FIG. 10. The example non-simultaneous component 1148 may also be configured to receive uplink data when the first priority is lower than the second priority, for example, as described in connection with 1020 of FIG. 10. The example non-simultaneous component 1148 may also be configured to receive uplink control information when the second priority is lower than the first priority, for example, as described in connection with 1022 of FIG. 10.

The apparatus may include additional components that perform each of the blocks of the algorithm in the flowcharts of FIG. 9 and/or 10. As such, each block in the flowcharts of FIG. 9 and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a UE, an overlapping uplink transmission configuration. The example apparatus 1102 also includes means for receiving, from the UE, an uplink transmission based at least in part on the overlapping uplink transmission configuration.

In another configuration, the example apparatus 1102 also includes means for receiving, from the UE, a capability report indicating that the UE is a first UE type or a second UE type.

In another configuration, the example apparatus 1102 also includes means for receiving uplink control information using a first CC. The example apparatus 1102 also includes means for receiving uplink data using a second CC, wherein the uplink control information and the uplink data are overlapping in a time-domain.

In another configuration, the example apparatus 1102 also includes means for receiving uplink data multiplexed with uplink control information.

In another configuration, the example apparatus 1102 also includes means for receiving uplink data multiplexed with uplink control information when a first priority associated with the uplink control information and a second priority associated with the uplink data are equal. The example apparatus 1102 also includes means for receiving the uplink data when the first priority is lower than the second priority. The example apparatus 1102 also includes means for receiving the uplink control information when the second priority is lower than the first priority.

In another configuration, the example apparatus 1102 also includes means for receiving the capability report after performing a RACH procedure.

In another configuration, the example apparatus 1102 also includes means for transmitting the overlapping uplink transmission configuration using at least one of RRC signaling, a MAC-CE, or DCI.

The means may be one or more of the components of the apparatus 1102 configured to perform the functions recited by the means. As described supra, the apparatus 1102 may include the TX processor 316, the RX processor 370, and the controller/processor 375. As such, in one configuration, the means may be the TX processor 316, the RX processor 370, and the controller/processor 375 configured to perform the functions recited by the means.

Aspects presented herein enable wireless communication devices to apply a configured overlapping uplink transmission mode to instances of overlapping uplink transmissions. For example, techniques disclosed herein receive an overlapping uplink transmission configuration from a base station that configures the overlapping uplink transmission mode that the UE is to apply when an occurrence of an overlapping uplink transmission is detected. In some examples, the overlapping uplink transmission configuration may be based on a capability of the UE. For example, the UE may be a legacy UE that is capable of performing multiplex-based or priority-based techniques when an overlapping uplink transmission occurrence is detected. In other examples, the UE may be capable of performing simultaneous transmissions in addition to the multiplex-based or priority-based techniques. Thus, it may be beneficial to configure the UE to apply an overlapping uplink transmission mode to an overlapping uplink transmission when an occurrence of an overlapping uplink transmission is detected.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including: receiving, from a base station, an overlapping uplink transmission configuration; detecting an occurrence of an overlapping uplink transmission comprising at least a portion of uplink control information and at least a portion of uplink data overlapping in a time domain; and transmitting at least one of the uplink control information or the uplink data based on the overlapping uplink transmission configuration.

Aspect 2 is the apparatus of aspect 1, further including: transmitting, to the base station, a capability report indicating that the UE is a first UE type or a second UE type, wherein the first UE type is capable of applying a simultaneous overlapping uplink transmission mode and a non-simultaneous overlapping uplink transmission mode on the overlapping uplink transmission and the second UE type is capable of applying the non-simultaneous overlapping uplink transmission mode on the overlapping uplink transmission, and wherein the overlapping uplink transmission configuration is based at least in part on the capability report.

Aspect 3 is the apparatus of any of aspects 1 and 2, further including that the UE is the first UE type and the overlapping uplink transmission configuration configures the UE to apply the simultaneous overlapping uplink transmission mode on the overlapping uplink transmission.

Aspect 4 is the apparatus of any of aspects 1 to 3, further including that the UE applies the simultaneous overlapping uplink transmission mode on the overlapping uplink transmission by transmitting the uplink control information using a first CC and by transmitting the uplink data using a second CC.

Aspect 5 is the apparatus of any of aspects 1 and 2, further including that the UE is the first UE type and the overlapping uplink transmission configuration configures the UE to apply the non-simultaneous overlapping uplink transmission mode on the overlapping uplink transmission.

Aspect 6 is the apparatus of any of aspects 1 to 5, further including that the UE applies the non-simultaneous overlapping uplink transmission mode on the overlapping uplink transmission by: multiplexing the uplink control information on to the uplink data; and transmitting the uplink data with the multiplexed uplink control information.

Aspect 7 is the apparatus of any of aspects 1 to 6, further including that the UE applies the non-simultaneous overlapping uplink transmission mode on the overlapping uplink transmission by: modifying the overlapping uplink transmission based on a first priority of the uplink control information and a second priority of the uplink data; and transmitting the modified overlapping uplink transmission.

Aspect 8 is the apparatus of any of aspects 1 to 7, further including that the UE modifies the overlapping uplink transmission by: multiplexing the uplink control information on to the uplink data when the first priority and the second priority are equal; dropping the uplink control information when the first priority is lower than the second priority; and dropping the uplink data when the second priority is lower than the first priority.

Aspect 9 is the apparatus of any of aspects 1 to 8, further including that the UE is the second UE type and the overlapping uplink transmission configuration configures the UE to apply the non-simultaneous overlapping uplink transmission mode on the overlapping uplink transmission.

Aspect 10 is the apparatus of any of aspects 1 to 9, further including that the UE transmits the capability report after performing a RACH procedure.

Aspect 11 is the apparatus of any of aspects 1 to 10, further including that the UE receives the overlapping uplink transmission configuration via at least one of RRC signaling, a MAC-CE, or DCI.

Aspect 12 is an apparatus for wireless communication at a UE including at least one processor coupled to a memory and configured to implement any of aspects 1 to 11.

Aspect 13 is an apparatus for wireless communication including means for implementing any of aspects 1 to 11.

Aspect 14 is a non-transitory computer-readable storage medium storing computer executable code, where the code, when executed, causes a processor to implement any of aspects 1 to 11.

Aspect 15 is a method of wireless communication at a base station, including:
  transmitting, to a UE, an overlapping uplink transmission configuration; and
  receiving, from the UE, an uplink transmission based at least in part on the overlapping uplink transmission configuration.

Aspect 16 is the apparatus of aspect 15, further including: receiving, from the UE, a capability report indicating that the UE is a first UE type or a second UE type, wherein the first UE type is capable of applying a simultaneous overlapping uplink transmission mode and a non-simultaneous overlapping uplink transmission mode on an overlapping uplink transmission and the second UE type is capable of applying the non-simultaneous overlapping uplink transmission mode on the overlapping uplink transmission, and wherein the overlapping uplink transmission configuration is based at least in part on the capability report.

Aspect 17 is the apparatus of any of aspects 15 and 16, further including that the base station transmits the overlapping uplink transmission configuration to configure the UE to apply the simultaneous overlapping uplink transmission mode on occurrences of overlapping uplink transmissions when the capability report indicates that the UE is the first UE type.

Aspect 18 is the apparatus of any of aspects 15 to 17, further including that receiving the uplink transmission comprises: receiving uplink control information using a first CC; and receiving uplink data using a second CC, wherein the uplink control information and the uplink data are overlapping in a time-domain.

Aspect 19 is the apparatus of any of aspects 15 and 16, further including that the base station transmits the overlapping uplink transmission configuration to configure the UE to apply the non-simultaneous overlapping uplink transmission mode on occurrences of overlapping uplink transmissions when the capability report indicates that the UE is the first UE type.

Aspect 20 is the apparatus of any of aspects 15 to 19, further including that receiving the uplink transmission comprises receiving uplink data multiplexed with uplink control information.

Aspect 21 is the apparatus of any of aspects 15 to 20, further including that receiving the uplink transmission comprises at least one of: receiving uplink data multiplexed with uplink control information when a first priority associated with the uplink control information and a second priority associated with the uplink data are equal; receiving the uplink data when the first priority is lower than the second priority; and receiving the uplink control information when the second priority is lower than the first priority.

Aspect 22 is the apparatus of any of aspects 15 to 21, further including that the base station receives the capability report after performing a RACH procedure.

Aspect 23 is the apparatus of any of aspects 15 to 22, further including that the base station transmits the overlapping uplink transmission configuration to configure the UE to apply the non-simultaneous overlapping uplink transmission mode on occurrences of overlapping uplink transmissions when the capability report indicates that the UE is the second UE type.

Aspect 24 is the apparatus of any of aspects 15 to 23, further including that the base station transmits the overlapping uplink transmission configuration using at least one of RRC signaling, a MAC-CE, or DCI.

Aspect 25 is an apparatus for wireless communication at a base station including at least one processor coupled to a memory and configured to implement any of aspects 15 to 24.

Aspect 26 is an apparatus for wireless communication including means for implementing any of aspects 15 to 24.

Aspect 27 is a non-transitory computer-readable storage medium storing computer executable code, where the code, when executed, causes a processor to implement any of aspects 15 to 24.

What is claimed is:

1. A method of wireless communication at a user equipment (UE), comprising:
   receiving, from a base station, an overlapping uplink transmission configuration;
   detecting an occurrence of an overlapping uplink transmission comprising at least a portion of uplink control information and at least a portion of uplink data overlapping in a time domain; and
   transmitting at least one of the uplink control information or the uplink data based on the overlapping uplink transmission configuration,
   wherein the UE is a first UE type or a second UE type, wherein the first UE type is capable of applying a simultaneous overlapping uplink transmission mode and a non-simultaneous overlapping uplink transmission mode on the overlapping uplink transmission and the second UE type is capable of applying the non-simultaneous overlapping uplink transmission mode on the overlapping uplink transmission,
   wherein the UE is (i) the first UE type and the overlapping uplink transmission configuration configures the UE to apply the simultaneous overlapping uplink transmission mode or the non-simultaneous overlapping uplink transmission mode on the overlapping uplink transmission or (ii) the second UE type and the overlapping uplink transmission configuration configures the UE to apply the non-simultaneous overlapping uplink transmission mode on the overlapping uplink transmission.

2. The method of claim 1, further comprising:
   transmitting, to the base station, a capability report indicating that the UE is the first UE type or the second UE type.

3. The method of claim 2, wherein the UE is the first UE type and the overlapping uplink transmission configuration configures the UE to apply the simultaneous overlapping uplink transmission mode on the overlapping uplink transmission.

4. The method of claim 3, wherein the UE applies the simultaneous overlapping uplink transmission mode on the overlapping uplink transmission by transmitting the uplink control information using a first component carrier (CC) and by transmitting the uplink data using a second CC.

5. The method of claim 2, wherein the UE is the first UE type and the overlapping uplink transmission configuration configures the UE to apply the non-simultaneous overlapping uplink transmission mode on the overlapping uplink transmission.

6. The method of claim 5, wherein the UE applies the non-simultaneous overlapping uplink transmission mode on the overlapping uplink transmission by:
   multiplexing the uplink control information on to the uplink data; and
   transmitting the uplink data with the multiplexed uplink control information.

7. The method of claim 5, wherein the UE applies the non-simultaneous overlapping uplink transmission mode on the overlapping uplink transmission by:
   modifying the overlapping uplink transmission based on a first priority of the uplink control information and a second priority of the uplink data; and
   transmitting the modified overlapping uplink transmission.

8. The method of claim 7, wherein the UE modifies the overlapping uplink transmission by:
   multiplexing the uplink control information on to the uplink data when the first priority and the second priority are equal;

dropping the uplink control information when the first priority is lower than the second priority; and
dropping the uplink data when the second priority is lower than the first priority.

9. The method of claim 2, wherein the UE is the second UE type and the overlapping uplink transmission configuration configures the UE to apply the non-simultaneous overlapping uplink transmission mode on the overlapping uplink transmission.

10. The method of claim 2, wherein the UE transmits the capability report after performing a random access channel (RACH) procedure.

11. The method of claim 1, wherein the UE receives the overlapping uplink transmission configuration via at least one of radio resource control (RRC) signaling, a medium access control-control element (MAC-CE), or downlink control information (DCI).

12. An apparatus for wireless communication at a user equipment (UE), comprising:
memory; and
at least one processor coupled to the memory, the at least one processor configured to:
receive, from a base station, an overlapping uplink transmission configuration;
detect an occurrence of an overlapping uplink transmission comprising at least a portion of uplink control information and at least a portion of uplink data overlapping in a time domain; and
transmit at least one of the uplink control information or the uplink data based on the overlapping uplink transmission configuration,
wherein the UE is a first UE type or a second UE type,
wherein the first UE type is capable of applying a simultaneous overlapping uplink transmission mode and a non-simultaneous overlapping uplink transmission mode on the overlapping uplink transmission and the second UE type is capable of applying the non-simultaneous overlapping uplink transmission mode on the overlapping uplink transmission,
wherein the UE is (i) the first UE type and the overlapping uplink transmission configuration configures the UE to apply the simultaneous overlapping uplink transmission mode or the non-simultaneous overlapping uplink transmission mode on the overlapping uplink transmission or (ii) the second UE type and the overlapping uplink transmission configuration configures the UE to apply the non-simultaneous overlapping uplink transmission mode on the overlapping uplink transmission.

13. The apparatus of claim 12, wherein the at least one processor is further configured to:
transmit, to the base station, a capability report indicating that the UE is the first UE type or the second UE type.

14. The apparatus of claim 13, wherein the UE is the first UE type, the at least one processor configured to apply the simultaneous overlapping uplink transmission mode on the overlapping uplink transmission based on the overlapping uplink transmission configuration.

15. The apparatus of claim 14, wherein to apply the simultaneous overlapping uplink transmission mode on the overlapping uplink transmission, the at least one processor is configured to transmit the uplink control information using a first component carrier (CC) and by transmitting the uplink data using a second CC.

16. The apparatus of claim 13, wherein the UE is the first UE type, the at least one processor configured to apply the non-simultaneous overlapping uplink transmission mode on the overlapping uplink transmission based on the overlapping uplink transmission configuration.

17. The apparatus of claim 16, wherein to apply the non-simultaneous overlapping uplink transmission mode on the overlapping uplink transmission, the at least one processor is configured to:
multiplex the uplink control information on to the uplink data; and
transmit the uplink data with the multiplexed uplink control information.

18. The apparatus of claim 16, wherein to apply the non-simultaneous overlapping uplink transmission mode on the overlapping uplink transmission, the at least one processor is configured to:
modify the overlapping uplink transmission based on a first priority of the uplink control information and a second priority of the uplink data; and
transmit the modified overlapping uplink transmission.

19. A method of wireless communication at a base station, comprising:
transmitting, to a user equipment (UE), an overlapping uplink transmission configuration; and
receiving, from the UE, an uplink transmission based at least in part on the overlapping uplink transmission configuration,
wherein the UE is a first UE type or a second UE type,
wherein the first UE type is capable of applying a simultaneous overlapping uplink transmission mode and a non-simultaneous overlapping uplink transmission mode on an overlapping uplink transmission and the second UE type is capable of applying the non-simultaneous overlapping uplink transmission mode on the overlapping uplink transmission,
wherein the UE is (i) the first UE type and the base station transmits the overlapping uplink transmission configuration to configure the UE to apply the simultaneous overlapping uplink transmission mode or the non-simultaneous overlapping uplink transmission mode on the overlapping uplink transmission or (ii) the second UE type and the base station transmits the overlapping uplink transmission configuration to configure the UE to apply the non-simultaneous overlapping uplink transmission mode on the overlapping uplink transmission.

20. The method of claim 19, further comprising:
receiving, from the UE, a capability report indicating that the UE is the first UE type or the second UE type.

21. The method of claim 20, wherein the base station transmits the overlapping uplink transmission configuration to configure the UE to apply the simultaneous overlapping uplink transmission mode on occurrences of overlapping uplink transmissions when the capability report indicates that the UE is the first UE type.

22. The method of claim 21, wherein receiving the uplink transmission comprises:
receiving uplink control information using a first component carrier (CC); and
receiving uplink data using a second CC, wherein the uplink control information and the uplink data are overlapping in a time-domain.

23. The method of claim 20, wherein the base station transmits the overlapping uplink transmission configuration to configure the UE to apply the non-simultaneous overlapping uplink transmission mode on occurrences of overlapping uplink transmissions when the capability report indicates that the UE is the first UE type.

24. The method of claim 23, wherein receiving the uplink transmission comprises receiving uplink data multiplexed with uplink control information.

25. The method of claim 23, wherein receiving the uplink transmission comprises at least one of:
   receiving uplink data multiplexed with uplink control information when a first priority associated with the uplink control information and a second priority associated with the uplink data are equal;
   receiving the uplink data when the first priority is lower than the second priority; and
   receiving the uplink control information when the second priority is lower than the first priority.

26. The method of claim 20, wherein the base station receives the capability report after performing a random access channel (RACH) procedure.

27. The method of claim 20, wherein the base station transmits the overlapping uplink transmission configuration to configure the UE to apply the non-simultaneous overlapping uplink transmission mode on occurrences of overlapping uplink transmissions when the capability report indicates that the UE is the second UE type.

28. The method of claim 19, wherein the base station transmits the overlapping uplink transmission configuration using at least one of radio resource control (RRC) signaling, a medium access control-control element (MAC-CE), or downlink control information (DCI).

29. An apparatus for wireless communication at a base station, comprising:
   memory; and
   at least one processor coupled to the memory, the memory and the at least one processor configured to:
      transmit, to a user equipment (UE), an overlapping uplink transmission configuration; and
      receive, from the UE, an uplink transmission based at least in part on the overlapping uplink transmission configuration,
   wherein the UE is a first UE type or a second UE type,
   wherein the first UE type is capable of applying a simultaneous overlapping uplink transmission mode and a non-simultaneous overlapping uplink transmission mode on an overlapping uplink transmission and the second UE type is capable of applying the non-simultaneous overlapping uplink transmission mode on the overlapping uplink transmission,
   wherein the UE is (i) the first UE type and the base station is configured to transmit the overlapping uplink transmission configuration to configure the UE to apply the simultaneous overlapping uplink transmission mode or the non-simultaneous overlapping uplink transmission mode on the overlapping uplink transmission or (ii) the second UE type and the base station is configured to transmit the overlapping uplink transmission configuration to configure the UE to apply the non-simultaneous overlapping uplink transmission mode on the overlapping uplink transmission.

30. The apparatus of claim 29, wherein the at least one processor is further configured to:
   receive, from the UE, a capability report indicating that the UE is the first UE type or the second UE type.

31. The apparatus of claim 30, wherein the at least one processor is further configured to:
   configure the UE with the overlapping uplink transmission configuration in accordance with the capability report indicating that the UE is the first UE type or the second UE type.

32. The method of claim 19, further comprising:
   configuring the UE with the overlapping uplink transmission configuration in accordance with the capability report indicating that the UE is the first UE type or the second UE type.

* * * * *